(12) United States Patent
Harrison et al.

(10) Patent No.: US 8,186,057 B2
(45) Date of Patent: May 29, 2012

(54) BLADED ROTOR BALANCING

(75) Inventors: John M. Harrison, Bristol (GB); Keith C. Goldfinch, Bristol (GB)

(73) Assignee: Rolls-Royce, PLC, London (GB)

( * ) Notice: Subject to any disclaimer, the term of this patent is extended or adjusted under 35 U.S.C. 154(b) by 995 days.

(21) Appl. No.: 12/216,504

(22) Filed: Jul. 7, 2008

(65) Prior Publication Data
US 2009/0035138 A1 Feb. 5, 2009

(30) Foreign Application Priority Data

Jul. 13, 2007 (GB) .................... 0713701.1

(51) Int. Cl.
*B21K 25/00* (2006.01)
(52) U.S. Cl. ..................... 29/889.23; 29/889; 29/889.21
(58) Field of Classification Search ............... 29/889.23, 29/889.21, 889.1, 889, 889.6, 889.7
See application file for complete search history.

(56) References Cited

U.S. PATENT DOCUMENTS

| | | | | |
|---|---|---|---|---|
| 2,581,193 | A * | 1/1952 | Le Compte | 264/265 |
| 6,039,542 | A * | 3/2000 | Schilling et al. | 416/233 |
| 2004/0018091 | A1* | 1/2004 | Rongong et al. | 416/229 A |
| 2004/0168291 | A1* | 9/2004 | Robbins | 29/406 |

FOREIGN PATENT DOCUMENTS

| | | |
|---|---|---|
| GB | 365027 A | 1/1932 |
| GB | 1089247 A | 11/1967 |
| GB | 2 105 790 A | 3/1983 |
| GB | 2 224 784 A | 5/1990 |
| GB | 2 319 812 A | 6/1998 |
| JP | A-2003-029099 | 1/2003 |
| WO | WO 98/12449 A2 | 3/1998 |

* cited by examiner

*Primary Examiner* — A. Sefer
*Assistant Examiner* — Nikolay Yushin
(74) *Attorney, Agent, or Firm* — Oliff & Berridge, PLC

(57) ABSTRACT

A method of manufacturing a rotating component, the method comprising the providing a component comprising a first portion, which first portion defines a first cavity, characterised by; identifying a first inertial property of the first portion and/or the entire component, introducing material into the first cavity to achieve an adjusted inertial property of the first portion and hence a desired inertial property of the component. A rotating component including a first portion defining a first cavity, a second portion defining a second cavity, the second portion being circumferentially spaced from said first portion, the first cavity has a first material deposit therein, said material having predetermined inertial characteristics so as to adjust the centre of mass (Z) of the rotating component.

26 Claims, 5 Drawing Sheets

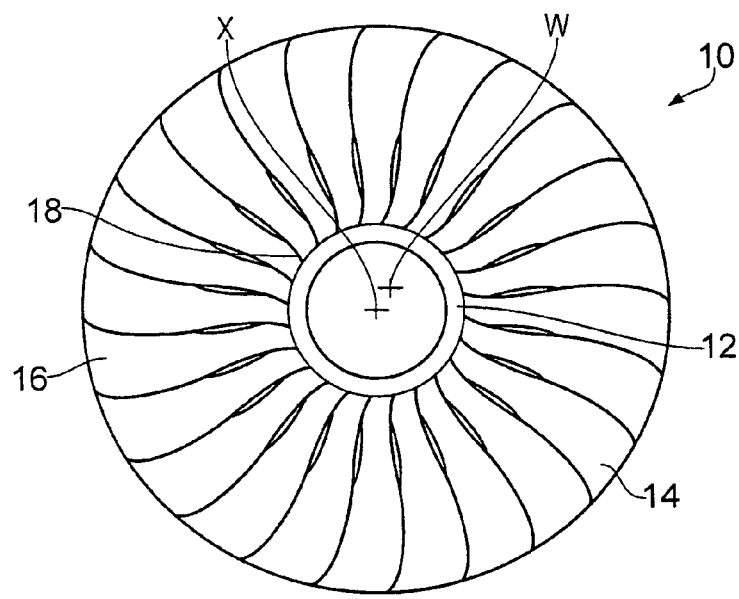
FIG. 1
RELATED ART
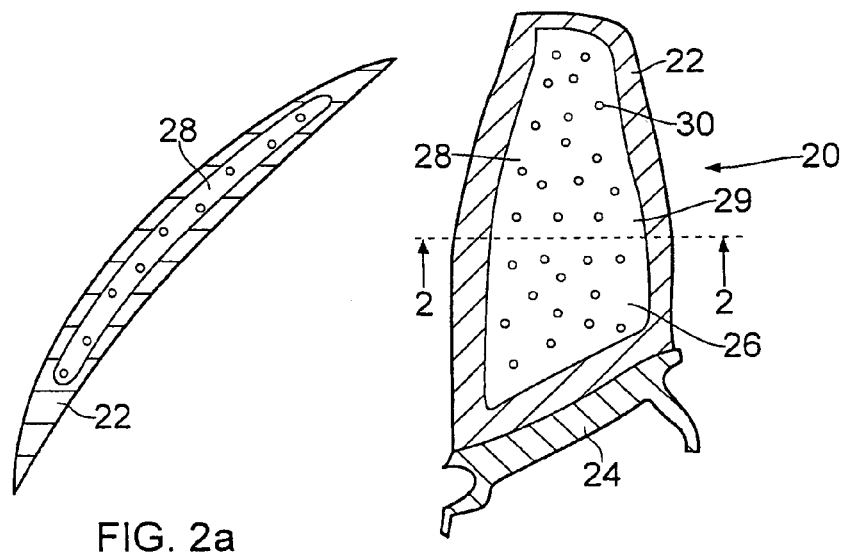
FIG. 2a
FIG. 2

BLADED ROTOR BALANCING

The present invention relates to a method of manufacture of a fan blade assembly and a component made by such a method. The invention is particularly, although not exclusively, concerned with components for use in gas turbine engines, for example fan blades.

High speed rotating assemblies such as fan blade assemblies in gas turbine engines need to be balanced; ie the centre of mass of the assembly needs to be as close as possible to the axis of rotation of the assembly. Any eccentricity resulting from a non-coincident centre of mass and axis of rotation will produce oscillations which may result in elevated vibration levels or resonance (high amplitude oscillation at certain resonant frequencies) potentially damaging the assembly and surrounding components, eg the main engine shaft. Additionally, large deformations may increase blade tip clearance.

However, addition of material during manufacture has negative implications for the disc bore or hub around which the fan blades are positioned. Due to the centrifugal force of the rotating blade's additional mass, the hub needs to be larger in order to carry the required loads without failure, which in turn results in a heavier assembly, which is undesirable in many applications.

Typically, components of fan assemblies include balance correction lands where material can be selectively removed or added late in the manufacturing process to correct any out-of-balance characteristics without affecting the aerodynamics of the blade. As such, these lands are necessarily positioned near the blade root (ie away from the aerofoil surface). This is problematic as the hub is positioned at a relatively small radius compared to the blade tip, and as such a significant amount of weight is required in order to give the correct amount of balance. This is because the effect of the added mass in moving the centre of mass of the assembly is proportional to its distance from that centre of mass. As such, a relatively small mass imbalance at a first blade tip demands a much larger mass addition to the diametrically opposite fan blade root in order to balance the assembly. This, in turn, adds significant weight to the assembly which as described is undesirable.

Manufacturing tolerances result in fan blades differing in their inertial properties. Therefore blades are typically mass moment weighed and selectively assembled onto the hub to allow a balanced assembly to be created through blade patternisation. Therefore knowledge of the individual characteristics of each blade (rather than the assembly) is required to create a balanced assembly (ie the assembly need not be balanced once assembled). Similarly, if a blade is damaged in use then a similar blade with a substantially similar mass-moment weight (or other suitable inertial property) can be used to replace it without balancing or re-balancing the entire assembly.

However, this method is problematic as a large array of blades is required to be kept in stock for replacement. Alternatively, metal working techniques such as addition or deletion of material at the lands, or addition of balancing weights, is required in order to provide a blade with a suitable mass-moment weight for replacement.

It is also known to provide blades and hubs (or discs) in a single component or blisk. As the blades are non-removably attached to the hub in blisk assemblies, it is not possible to change the balance of the assembly by switching blades (for example exchanging a blade of a first mass moment weight with a blade of a second, different, mass-moment weight). Therefore, blisk designs often include large balance correction lands in order to correct any residual out-of-balance characteristics.

An alternative solution to this problem is mass-centring, in which the central orifice through the blisk into which the engine shaft is inserted is machined such that its centre coincides with the measured (or calculated) centre of mass of the blisk (ie the axis of rotation is set at the centre of mass of the assembly). This is a complex and expensive process, and may result with the blisk, although balanced, having an eccentricity present at the blade tips, causing problems with tip clearance and sealing. What is required is an inexpensive and efficient way of altering the inertial properties of individual blades and blisks in order to balance them both at the manufacturing stage and in service.

It is an object of the present invention to overcome one or more of these disadvantages.

According to a first aspect of the present invention, there is provided a method of manufacturing a rotating component, the method comprising the following steps: providing a component comprising a first portion, which first portion defines a first cavity, characterised by; identifying a first inertial property of the first portion and/or the entire component, introducing material into the first cavity to achieve an adjusted inertial property of the first portion and hence a desired inertial property of the component.

According to a second aspect of the invention there is provided a rotating component comprising: a first portion defining a first cavity, a second portion defining a second cavity, the second portion being circumferentially spaced from said first portion, characterised in that the first cavity has a first material deposit therein, said material having predetermined inertial characteristics so as to adjust the centre of mass of the rotating component.

Preferably, the second cavity comprises a second material deposit therein, said second material deposit configured to adjust the centre of mass of the rotating component. In this way, the configuration of material may vary from blade to blade such that if a damping material is used (for example), the damping function is retained in each blade with the existence of such material whilst the component balance may be altered by providing varying configurations of material from blade to blade.

Embodiments of the invention will now be described with reference to the accompanying drawings, in which:

FIG. 1 is a front view of a related art fan blade assembly;

FIG. 2 is a cross-sectional view of an individual blade made in accordance with a first embodiment of the present invention;

FIG. 2a is a cross-sectional view of the blade of FIG. 2 along line 2-2;

Figure 3:
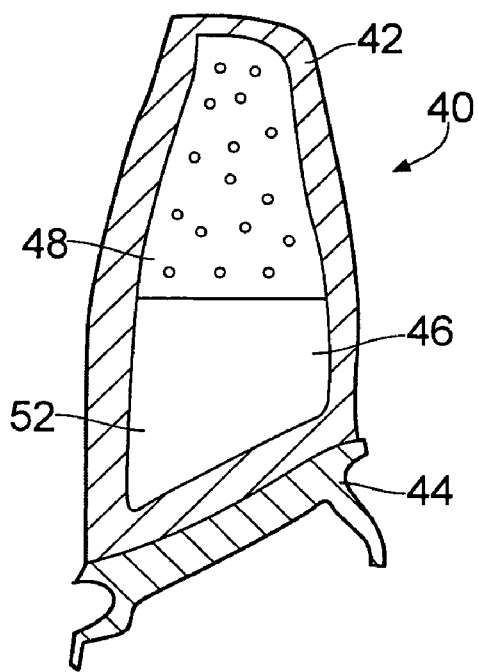
FIG. 3 is a cross-sectional view of a blade made in accordance with a second embodiment of the present invention.

Referring to FIG. 1, a related art fan blade assembly 10 is shown. The related art fan blade assembly 10 comprises a disc, or hub 12 around which are positioned a plurality of circumferentially spaced blades 14. Each blade 14 comprises an aerofoil 16 integral with a blade root 18 which connects to the hub 12 in order to retain the blade in position. In alternative arrangements, the hub 12 and blades 14 are formed as a single component, known as a blisk.

In use, the main shaft of a gas turbine engine (not shown) is non-rotationally attached to the hub 12 such that the entire assembly 10 rotates about axis X when the gas turbine engine operates.

Each of the blades 14 has inertial properties, such as mass, mass distribution and mass-moment-weight which affect the centre of mass of the fan blade assembly. Due to manufacturing tolerances, the blades 14 vary in terms of these inertial properties. As such, the assembly 10 is generally out of balance, with a centre of mass W being spaced apart from an axis of rotation X (when the assembly is rotating in operation).

This imbalance is generally accounted for by the known methods described above.

A blisk 20 is shown in FIG. 2 in accordance with a first embodiment of the present invention. Blisk 20 comprises a fan blade body, or aerofoil, 22 and a disk/hub 24. The fan blade 22 comprises a cavity 26 suitable for receiving a filler material 28, specifically a hardening visco-elastic material 26 capable of damping vibrations of the blade 22, although any suitable material may be used.

The filler material 28 is a visco-elastic fill material 29 containing a plurality of hollow glass spheres 30. These hollow spheres 30 do not significantly impact the damping performance of the filler material 28, but rather simply occupy space in the cavity 26 such that less of the visco-elastic component 29 of the filler material 28 can be inserted into cavity 26. Therefore by varying the number of hollow spheres 30 in a given mass of filler material 28, it is possible to alter the density of the filler material (as the visco-elastic component is generally heavier than air). In this manner, it is possible, for example, to fill a first blade with a high density filler material 28 (with a low number of spheres 30) and a second blade which is, by way of example only, circumferentially opposite the first blade, with a low density filler material (ie with a high number of spheres 30). Alternatively, filler materials 28 and hollow spheres 30 of different densities could be combined to achieve a desired weight distribution. The density of the filler material 28 may be varied by using hollow spheres 30 of different diameter. The end result of such processes would be two blades 20 with substantially identical geometry and damping properties, however with significantly different inertial properties (eg mass). This will be discussed further below.

Similarly, a predetermined amount of high density filler could be added to the cavity first, followed by a predetermined amount of low density filler. Conversely, in a further blade the same predetermined amount of low density filler could be added to the cavity first, followed by the same predetermined amount of high density filler. Therefore, the two blades would have the same mass, but different mass distributions (ie the centre of mass of the further blade would be positioned nearer the blade tip).

Referring now to FIG. 3, a fan blisk 40 made in accordance with a second embodiment of the present invention is shown. The blisk 40 is substantially similar to the blisk 20 comprising an aerofoil 42, a disk/hub 44 and a cavity 46.

However the cavity 46 is only partially filled with a visco-elastic filler material 48. A remaining part 52 of the cavity 46 remains empty. In this particular embodiment the blisk 40 was inverted with respect of FIG. 3 when being filled such that the visco-elastic filler material sits near to the tip of the blisk 40.

It will be noted that the weight of the blisk 40 may be changed selectively by varying the amount of filler 48 present in the cavity 46. As such, the inertial properties of blisk 40 can be altered in a similar way to blisk 20.

Because the blisk 40 is effectively a cantilever in-use, with disk/hub 44 built-in, the damping properties of the filler 48 are most useful near the blade tip as this is the region of highest displacement. It is therefore preferable that the damping material be positioned here. Therefore the vacancy of the portion 52 has little effect on the damping effect of the filler material 48.

Figure 4:
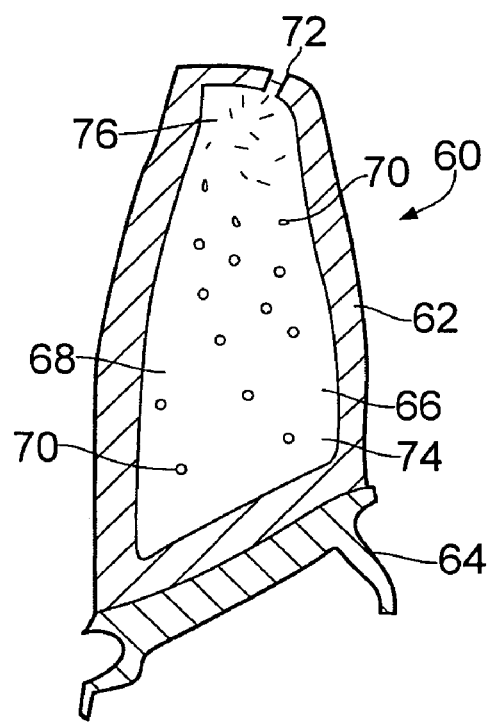
FIG. 4 is a cross-sectional view of a blade made in accordance with a third embodiment of the present invention.

Referring now to FIG. 4, a blisk 60 is shown made in accordance with a third embodiment of the present invention. The blisk 60 is substantially similar to blisk 40 but it will be noted that a cavity 66 has been completely filled with a filler material 68.

In this embodiment, the filler material 68 contains a plurality of compressible hollow spheres 70. The filler material 68 is injected into the cavity 66 via an aperture 72. However, instead of stopping the flow of filler material 68 through the aperture 72 when the cavity 66 is full, it continues to be fed in such that a pressure gradient builds up from the root/base 64 to the tip of the blisk 60.

As such the cavity 66 contains filler material 68 ranging from a lower pressure region 74 near the root/base to a high pressure region 76 near the tip. It will be noted that because the spheres 70 are compressible, this high density can be achieved with a substantially incompressible visco-elastic damping material. An increased density of, for example, 20% may be achieved at the high density region 76 over the low density region 74.

As the filler material 68 is of a controllable density, it is possible to vary the inertial properties of the blisk 60 in a similar manner to blisks 20 and 40.

It should also be noted that the high pressure region can be moved by altering the position of the aperture 72. For example, a centre-fill, root-fill or combined root and tip fill may be appropriate for creating different locations with one or more high density regions 76. Other patterns may be achieved by allowing the filler to set in one region before injecting and pressurising filler in an adjacent region.

Figure 5:
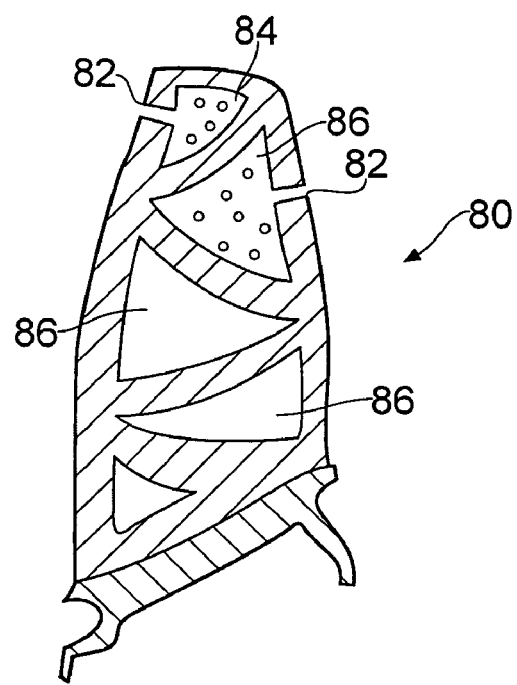
FIG. 5 is a cross-sectional view of a blade made in accordance with a fourth embodiment of the present invention.

A fan blade 80 made in accordance with a fourth embodiment of the present invention is shown in FIG. 5. As can be seen, the fan blade 80 comprises a plurality of cavities 86. Utilising apertures 82, the cavities 86 may be selectively filled to provide a desired distribution of a filler material 84. Again, this allows for the filler material 84 to be positioned at the tip of the blade where it is most needed, and also for the mass distribution of the filler material 84 to be controlled such that the inertial properties of individual blades 80 can be varied. It should be noted that each cavity may also be filled in accordance with any of the previous embodiments 20, 40, 60.

Figure 6:
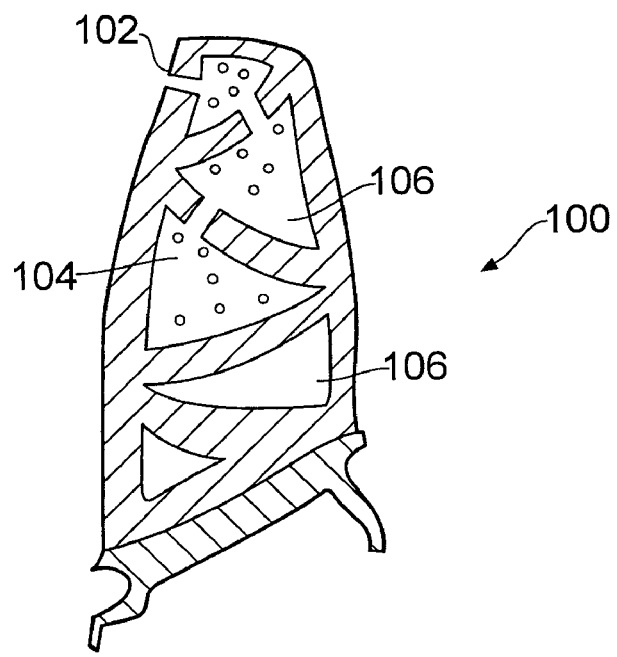
FIG. 6 is a cross-sectional view of a blade made in accordance with a fifth embodiment of the present invention.

Another fan blade 100 is shown in FIG. 6 which is substantially similar to blade 80. However, the parts of the blade 100 delimiting the cavities 106 have orifices therethrough such that only a single aperture 102 need be utilised in order to provide filler material 104 into the cavities 106.

Figure 7:
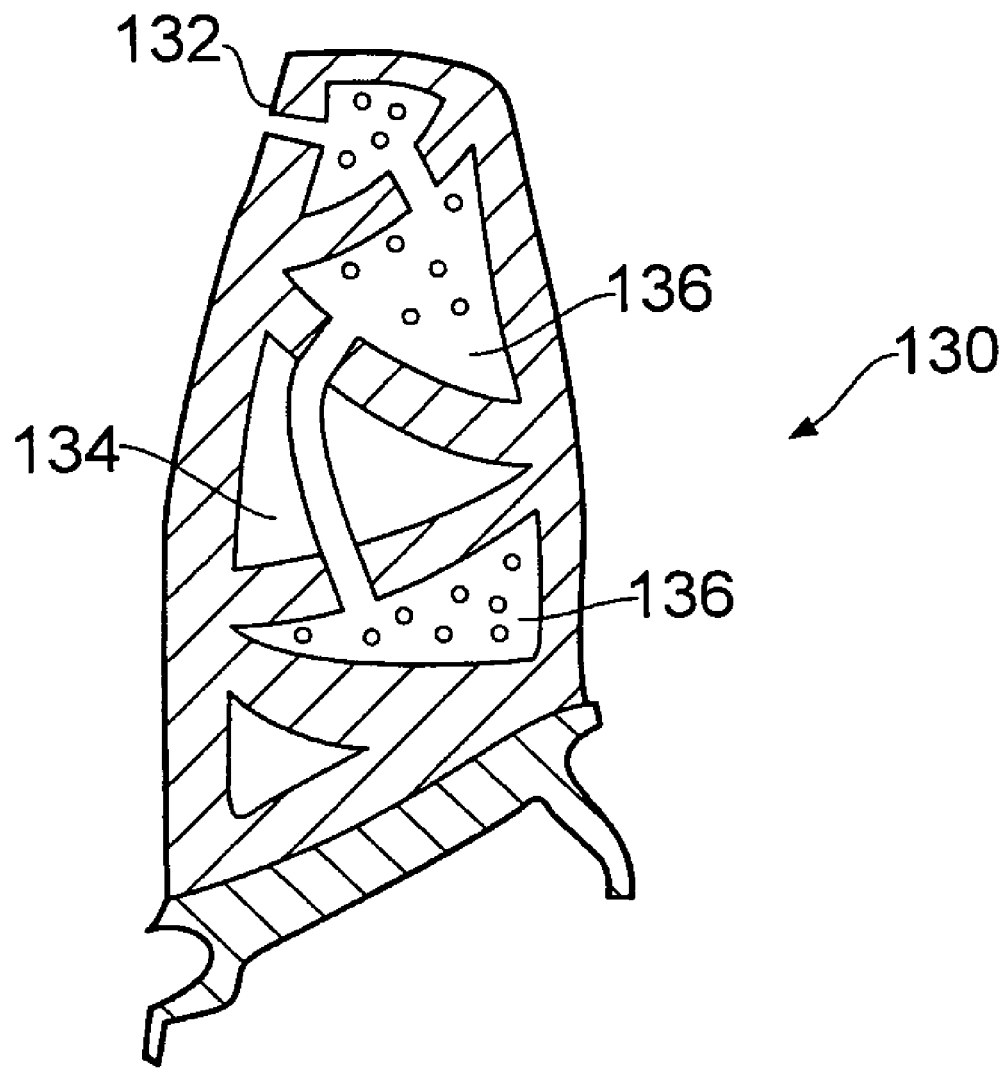
FIG. 7 is a cross-sectional view of a blade made in accordance with a sixth embodiment of the present invention.

A further fan blade 130 is shown in FIG. 7 which is substantially similar to blade 100. However, the parts of the blade 130 delimiting the cavities 136 have orifices therethrough such that only a single aperture 132 need be utilised in order to provide filler material 134 into the cavities 136. However, a tube 138 is provided between orifices such that cavities 136 can be filled, while cavity 134 is left empty of filler material.

It should be noted that as shown in FIG. 2a, each of the cavities 26, 46, 66, 86, 106 are substantially completely enclosed within the aerofoil with the exception of orifices with which to fill the cavities. As such the impinging airflow when in use does not contact the filler material, and the surface finish of the blade is intact.

Figure 8:
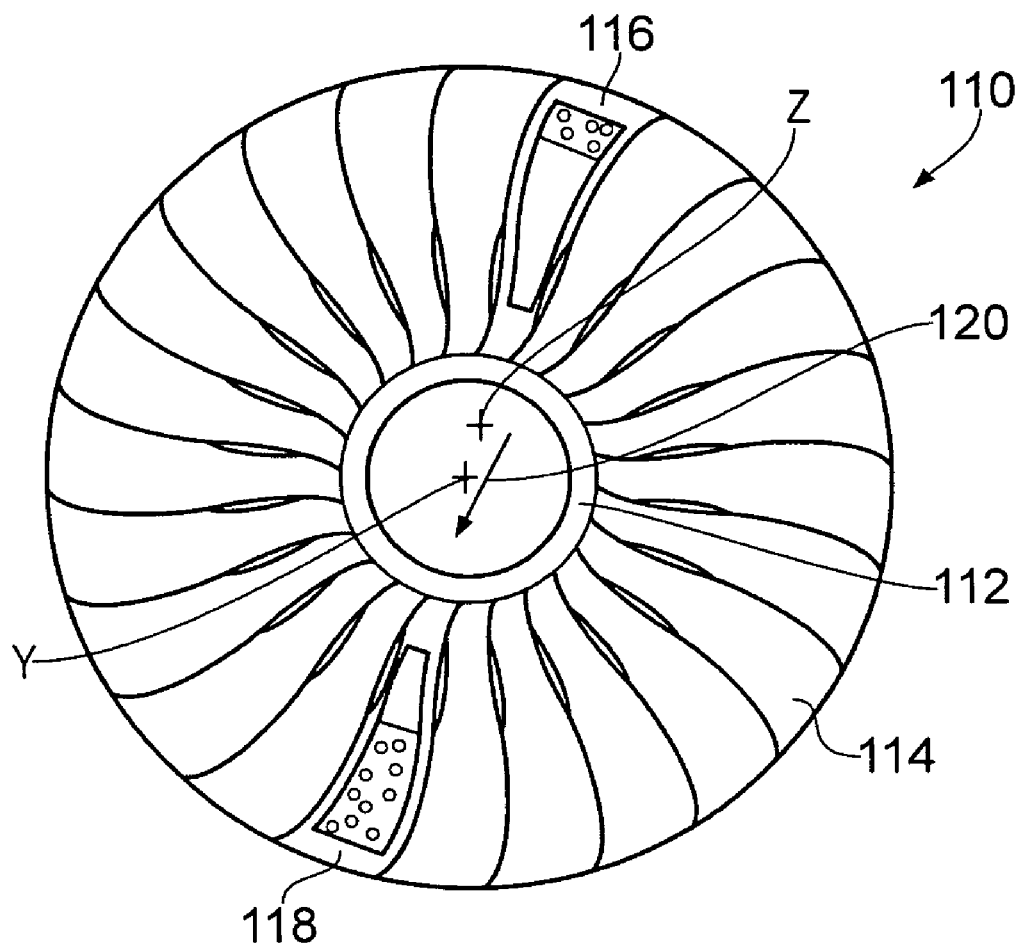
FIG. 8 is a front view of a fan blade assembly made in accordance with the present invention.

Referring to FIG. 8, the fan blade assembly 110 comprises a hub/disk 112 and a plurality of blades 114 manufactured in accordance with the present invention.

In use, the assembly 110 rotates about axis Y on the engine shaft (not shown). The assembly 110 comprises a first fan blade 116 and a second fan blade 118 opposite thereto. Prior to balancing according to the present invention, the assembly 100 has a centre of mass Z, offset from the axis Y.

In order to balance the assembly 110, fan blade 110 has had its inertial properties adjusted by any of the methods mentioned above with reference to the fan blades 20, 40, 60, 80 or 100. For example, as can be seen in FIG. 8 the blade 118 has been filled with a larger mass of filler than blade 116, in a similar manner to that described with respect to blisk 40. This has the effect of moving the centre of mass Z in direction 120, and the exact amount and density of filler may be tailored to make the centre of mass Z coincident with the axis of rotation Y, thus balancing assembly 110.

It will be appreciated that advantageously the inertial properties of the fan blades can be adjusted post-metal manufacture and furthermore in service if required.

Therefore, addition and/or removal of material from lands is not necessary. It is also not necessary to source blades of the correct characteristics when replacement is required as an off-the-shelf blade can be used with a post-manufacture inserted amount of filler to meet the required inertial properties.

The present invention enables the production of a balanced rotor which may be lighter than that balanced by conventional metal addition or removal techniques. Such techniques usually involve adding or removing metal from the disk/hub and or close to the blade root/base (as opposed to the blade tip). However, if a balancing mass can be added to the blade radially outward of the disc, then the same balancing effect can be achieved with less mass. In the present invention mass (ie the filler material) is added into the blade itself, and may be selectively added to any location within the blade cavity. Potentially, therefore, the amount of material required to be added to the rotor according to the present invention is less than in conventional rotors. In applications where weight saving is a concern, for example in rotors of gas turbine engines for aircraft, this is clearly a significant advantage.

It will be appreciated that the invention can not only be used on one piece hubs/disks and blades (blisks) but also on blade and disk assemblies (for example, where a blade is attached to a disk by a fir tree type arrangement), and indeed any type of rotating component where balancing is important.

It will be appreciated that conventional manufacturing techniques will produce blades having different inertial properties, so when assembled will produce an out of balance rotor. The present invention allows for the manufacture of an entire blade set for a rotor where each of the blades is of substantially the same mass. Thus balancing a bladed rotor according to the present invention is more easily achieved when new and during a refitting/refurbishment process where some of the blades are replaced.

It should also be appreciated that the damping material may not be a filler but could be an interior lining or coating of the cavities.

The damping material can be introduced into a cavity on the external surface of the aerofoil and shaped to take up a desired aerodynamic profile.

Since the balancing mass (ie the filler material) is added to an internal cavity of the blade, or provided and shaped on the external surface to produce a desired aerodynamic profile, the external aerodynamics of the rotor are unaffected.

The invention claimed is:

1. A method of manufacturing a rotor for a gas turbine engine, the method comprising:
   providing a component, the component being a rotor, the rotor having a first portion, the first portion defining a first cavity;
   measuring a first centre of mass of the first portion and the component;
   introducing a visco elastic vibration damping material into the first cavity to: i) achieve an adjusted centre of mass of the first portion and hence a predetermined centre of mass of the component, and ii) adjust vibration damping properties of the first portion to achieve a predetermined vibration damping characteristic.

2. The method of manufacturing according to claim 1 wherein, after the step of measuring the first centre of mass, and before the step of introducing the visco elastic vibration damping material, further comprises:
   determining an amount of the visco elastic vibration damping material to be introduced.

3. The method of manufacturing according to claim 1 further comprising:
   pressurising the visco elastic vibration damping material in the first cavity.

4. The method of manufacturing according to claim 1, wherein
   the step of providing the component further comprises:
      providing the first portion with a plurality of cavities; and
   wherein the step of introducing the visco elastic vibration damping material further comprises
      selectively filling the plurality of cavities.

5. The method of manufacturing according to claim 1 wherein the rotor is an integral component, such as a blisk.

6. The method of manufacturing according to claim 1 wherein the step of measuring the first centre of mass of the first portion and/or the component further comprises:
   measuring the centre of mass of the rotor.

7. The method of manufacturing according to claim 1 further comprising:
   determining an axis of rotation (Y) of the rotor in use, and wherein the step of measuring a centre of mass of the rotor (Z), the step of introducing the visco elastic vibration damping material further comprises:
   introducing the visco elastic vibration damping material into the first cavity to achieve the predetermined centre of mass of the rotor, the predetermined centre of mass being nearer to the axis of rotation than is the first centre of mass, in a plane of rotation perpendicular to the axis of rotation.

8. A rotor for a gas turbine engine manufactured in accordance with claim 1.

9. The method of manufacturing according to claim 1 wherein, the visco elastic vibration damping material includes:
   a first phase;
   a second phase, the first phase and the second phase being of substantially different density; and
   the adjusted centre of mass is achieved by varying a ratio between the first phase and the second phase of the visco elastic vibration damping material that is introduced into the first cavity.

10. The method of manufacturing according to claim 9 wherein, the visco elastic vibration damping material is a syntactic foam.

11. The method of manufacturing according to claim 1 further comprising:
   providing a second portion of the rotor; and
   measuring a second centre of mass of the second portion.

12. The method of manufacturing according to claim 11 wherein the step of providing the second portion includes the step of providing the second portion with a second cavity, the method further comprising:
   introducing a substantially different configuration of material into the second cavity relative to the first cavity.

13. The method of manufacturing according claim 12 wherein the step of introducing the visco elastic vibration damping material into the first cavity or the first and second cavity comprises the step of introducing the visco elastic vibration damping material into the first cavity or the first and second cavity such that the first portion and the second portion are of substantially equal mass.

14. A method of manufacturing a rotor for a gas turbine engine, the method comprising:
   providing a component, the component being a rotor, the rotor having a first portion, the first portion defining a first cavity;
   measuring a first centre of mass of the first portion or the component;
   introducing a visco elastic vibration damping material into the first cavity to: i) achieve an adjusted centre of mass of the first portion and hence a predetermined centre of mass of the component, and ii) adjust vibration damping properties of the first portion to achieve a predetermined vibration damping characteristic.

15. The method of manufacturing according to claim 14 wherein, after the step of measuring the first centre of mass, and before the step of introducing the visco elastic vibration damping material, further comprises:
   determining an amount of the visco elastic vibration damping material to be introduced.

16. The method of manufacturing according to claim 14 further comprising:
   pressurising the visco elastic vibration damping material in the first cavity.

17. The method of manufacturing according to claim 14, wherein the step of providing the component further comprises:
   providing the first portion with a plurality of cavities; and
   wherein the step of introducing the visco elastic vibration damping material further comprises:
   selectively filling the plurality of cavities.

18. The method of manufacturing according to claim 14 wherein the rotor is an integral component, such as a blisk.

19. The method of manufacturing according to claim 14 wherein the step of measuring the first centre of mass of the first portion and/or the component further comprises:
   measuring the centre of mass of the rotor.

20. The method of manufacturing according to claim 14 further comprising:
   determining an axis of rotation (Y) of the rotor in use, and wherein the step of measuring a centre of mass of the rotor (Z), the step of introducing the visco elastic vibration damping material further comprises:
   introducing the visco elastic vibration damping material into the first cavity to achieve the predetermined centre of mass of the rotor, the predetermined centre of mass being nearer to the axis of rotation than is the first centre of mass, in a plane of rotation perpendicular to the axis of rotation.

21. A rotor for a gas turbine engine manufactured in accordance with claim 14.

22. The method of manufacturing according to claim 14 wherein, the visco elastic vibration damping material includes:
   a first phase;
   a second phase, the first phase and the second phase being of substantially different density; and
   the adjusted centre of mass is achieved by varying a ratio between the first phase and the second phase of the visco elastic vibration damping material that is introduced into the first cavity.

23. The method of manufacturing according to claim 22 wherein, the visco elastic vibration damping material is a syntactic foam.

24. The method of manufacturing according to claim 14 further comprising:
   providing a second portion of the rotor; and
   measuring a second centre of mass of the second portion.

25. The method of manufacturing according to claim 24 wherein the step of providing the second portion includes the step of providing the second portion with a second cavity, the method further comprising:
   introducing a substantially different configuration of material into the second cavity relative to the first cavity.

26. The method of manufacturing according claim 25 wherein the step of introducing the visco elastic vibration damping material into the first cavity or the first and second cavity comprises the step of introducing the visco elastic vibration damping material into the first cavity or the first and second cavity such that the first portion and the second portion are of substantially equal mass.

* * * * *